(12) United States Patent
Mammeri et al.

(10) Patent No.: US 12,024,009 B2
(45) Date of Patent: Jul. 2, 2024

(54) COOLING MODULE FOR AN ELECTRIC MOTOR VEHICLE, COMPRISING A TANGENTIAL-FLOW TURBOMACHINE

(71) Applicant: Valeo Systemes Thermiques, Le Mesnil Saint-Denis (FR)

(72) Inventors: Amrid Mammeri, Le Mesnil Saint Denis (FR); Kamel Azzouz, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 170 days.

(21) Appl. No.: 17/439,193

(22) PCT Filed: Mar. 12, 2020

(86) PCT No.: PCT/FR2020/050509
§ 371 (c)(1),
(2) Date: Sep. 14, 2021

(87) PCT Pub. No.: WO2020/188188
PCT Pub. Date: Sep. 24, 2020

(65) Prior Publication Data
US 2022/0153128 A1   May 19, 2022

(30) Foreign Application Priority Data
Mar. 15, 2019   (FR) ........................ 1902672

(51) Int. Cl.
*B60K 11/00*   (2006.01)
*B60K 11/04*   (2006.01)
(Continued)

(52) U.S. Cl.
CPC ............ *B60K 11/04* (2013.01); *B60K 11/085* (2013.01); *B60K 2001/006* (2013.01)

(58) Field of Classification Search
CPC ................... B60K 11/04; B60K 11/08
(Continued)

(56) References Cited

U.S. PATENT DOCUMENTS

| 4,279,569 A | * | 7/1981 | Harloff | ..................... F01D 1/14 |
| | | | | 415/53.3 |
| 4,445,583 A | * | 5/1984 | Mazur | ...................... F01P 5/04 |
| | | | | 236/35 |

(Continued)

FOREIGN PATENT DOCUMENTS

| CN | 102574459 A | 7/2012 |
| CN | 104648078 A | 5/2015 |

(Continued)

OTHER PUBLICATIONS

International Search Report with Written Opinion issued in corresponding International Application No. PCT/FR2020/050509, mailed Jun. 8, 2020 (13 pages).

(Continued)

*Primary Examiner* — Hau V Phan
(74) *Attorney, Agent, or Firm* — Osha Bergman Watanabe & Burton LLP

(57) ABSTRACT

The invention relates to a cooling module (22) for a motor vehicle (10) with an electric motor (12), comprising: —at least one heat exchanger ($30_1$-$30_4$); —at least one tangential-flow turbomachine (28) capable of creating an air flow that comes into contact with the plurality of heat exchangers ($30_1$-$30_4$); —a plurality of flaps (36P, 36A) movable between a first position, referred to as the position opening the cooling module (22), and a second position, referred to as the position closing the cooling module (22), said plurality of flaps (36P, 36A) occupying a portion of the cooling module not occupied by said at least one tangential-flow turbomachine (28).

8 Claims, 13 Drawing Sheets

(51) Int. Cl.
*B60K 11/08* (2006.01)
*B60K 1/00* (2006.01)

(58) Field of Classification Search
USPC .......................................... 180/68.1
See application file for complete search history.

(56) References Cited

U.S. PATENT DOCUMENTS

| | | | | |
|---|---|---|---|---|
| 4,539,943 | A * | 9/1985 | Tsuchikawa | F04D 17/04 |
| | | | | 123/41.12 |
| 4,832,116 | A * | 5/1989 | Easton | F01P 11/12 |
| | | | | 165/95 |
| 5,094,586 | A * | 3/1992 | Takada | F04D 29/444 |
| | | | | 415/53.3 |
| 5,735,338 | A * | 4/1998 | Chevroulet | B60H 1/0005 |
| | | | | 219/202 |
| 6,086,327 | A * | 7/2000 | Mack | F01D 17/162 |
| | | | | 384/273 |
| 6,142,213 | A * | 11/2000 | Gallivan | F01P 11/10 |
| | | | | 165/41 |
| 6,192,838 | B1 * | 2/2001 | Matsuo | F01P 11/10 |
| | | | | 123/41.11 |
| 6,554,563 | B2 * | 4/2003 | Noe | F01D 5/189 |
| | | | | 415/115 |
| 7,011,360 | B2 * | 3/2006 | Lanard | B60R 19/12 |
| | | | | 293/115 |
| 7,517,185 | B2 * | 4/2009 | Hirakawa | F24F 1/0025 |
| | | | | 415/119 |
| 8,052,374 | B2 * | 11/2011 | Ricketts | A01F 12/444 |
| | | | | 415/203 |
| 8,221,064 | B2 * | 7/2012 | Ricketts | A01F 12/444 |
| | | | | 415/203 |
| 9,573,437 | B2 * | 2/2017 | Osaka | B60H 1/0005 |
| 9,945,578 | B2 * | 4/2018 | Vanberg | F24F 11/52 |
| 10,155,438 | B2 * | 12/2018 | Vacca | B60K 11/08 |
| 10,208,983 | B2 * | 2/2019 | Hjorth | E21B 43/26 |
| 10,221,750 | B2 * | 3/2019 | Kim | F01P 11/10 |
| 10,416,008 | B2 * | 9/2019 | Vanberg | F01P 1/06 |
| 11,142,059 | B2 * | 10/2021 | Vacca | B62D 25/085 |
| 2005/0022965 | A1 * | 2/2005 | Mori | F28F 9/002 |
| | | | | 165/76 |
| 2005/0023057 | A1 | 2/2005 | Maeda et al. | |
| 2006/0254838 | A1 | 11/2006 | Ino et al. | |
| 2011/0146320 | A1 * | 6/2011 | Tomiyama | B60H 1/3208 |
| | | | | 62/296 |
| 2012/0024611 | A1 * | 2/2012 | Ajisaka | B60K 11/08 |
| | | | | 180/68.1 |
| 2013/0022432 | A1 * | 1/2013 | Spitler | F01P 3/18 |
| | | | | 165/41 |
| 2014/0132033 | A1 * | 5/2014 | Townson | B62D 27/06 |
| | | | | 296/193.1 |
| 2017/0043659 | A1 * | 2/2017 | Vacca | B62D 25/085 |

FOREIGN PATENT DOCUMENTS

| | | |
|---|---|---|
| CN | 107000573 A | 8/2017 |
| CN | 109414985 A | 3/2019 |
| DE | 2306317 A1 | 8/1974 |
| DE | 102006026488 A1 | 2/2007 |
| EP | 1473449 A1 | 11/2004 |
| EP | 1715157 A1 | 10/2006 |
| JP | S60-65223 A | 4/1985 |
| JP | 2006341683 A | 12/2006 |
| WO | 2016/079938 A1 | 5/2016 |
| WO | 2017153661 A2 | 9/2017 |
| WO | 2018150110 A1 | 8/2018 |

OTHER PUBLICATIONS

Office Action Issued in Corresponding CN Application No. 202080021122.2, Dated Feb. 11, 2023. (7 pages).

\* cited by examiner

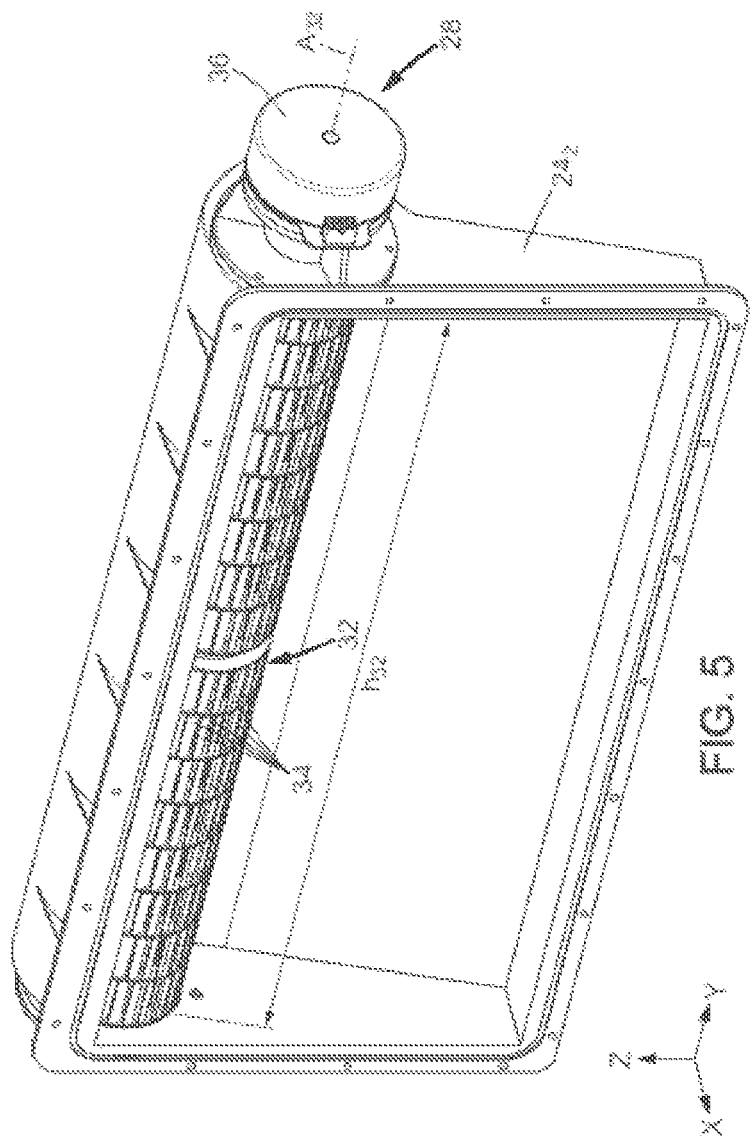

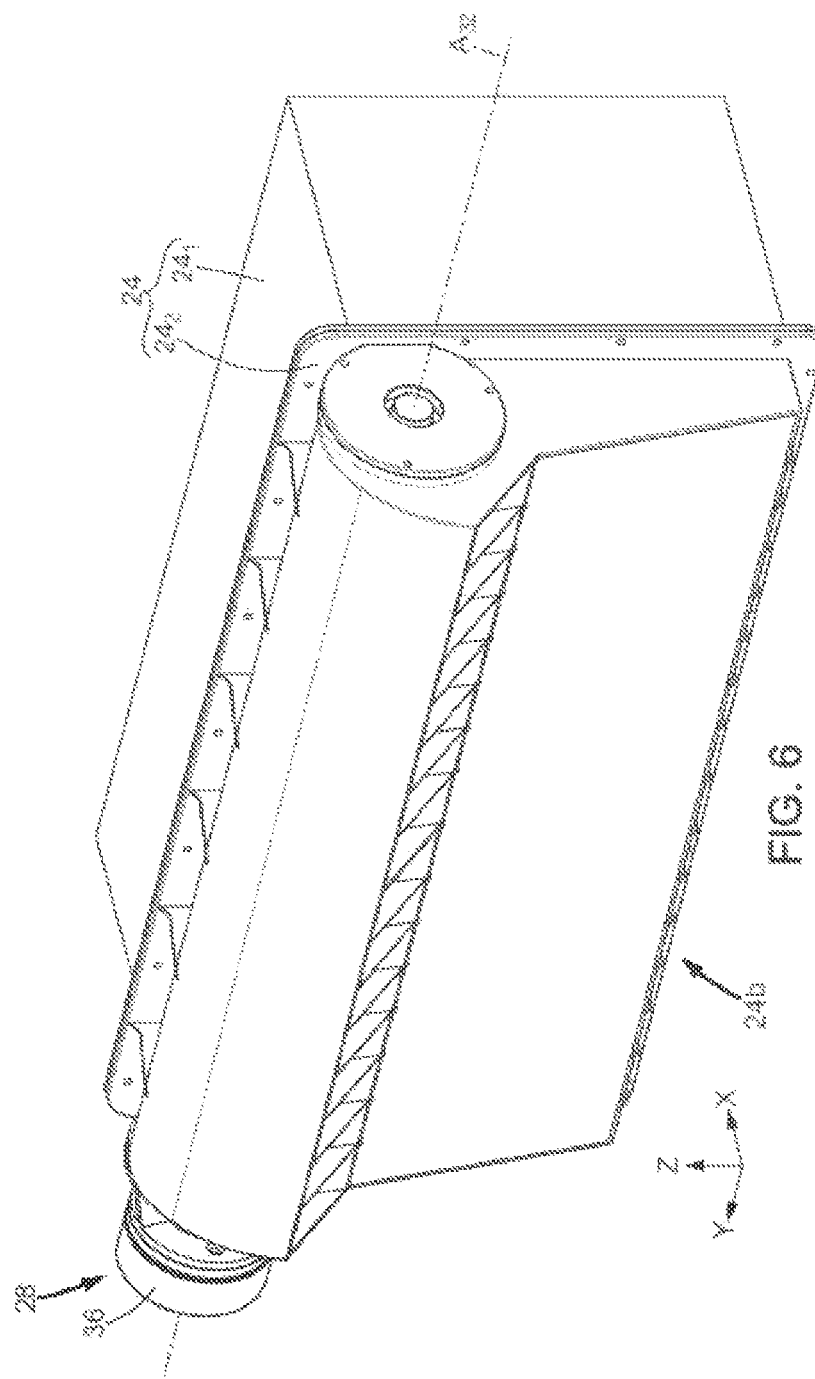

[Fig. 12]

COOLING MODULE FOR AN ELECTRIC MOTOR VEHICLE, COMPRISING A TANGENTIAL-FLOW TURBOMACHINE

TECHNICAL FIELD

The invention concerns a cooling module for an electric motor vehicle, comprising a tangential-flow turbomachine. The invention also concerns an electric motor vehicle equipped with such a cooling module.

PRIOR ART

A cooling module (or heat-exchange module) of a motor vehicle conventionally comprises at least one heat exchanger and a ventilation device which is designed to generate an air flow in contact with the at least one heat exchanger. The ventilation device thus allows for example creation of an air flow in contact with the heat exchanger when the vehicle is stationary.

In motor vehicles with conventional internal combustion engines, the at least one heat exchanger has a substantially square form, the ventilation device then being a propeller fan of diameter substantially equal to the side of the square formed by the heat exchanger.

Conventionally, the heat exchanger is then placed opposite at least two cooling openings formed in the front face of the body of the motor vehicle. A first cooling opening is situated above the bumper, while a second opening is situated below the bumper. Such a configuration is preferred since the internal combustion engine must also be supplied with air, the engine air intake being conventionally situated in the passage of the air flow through the upper cooling opening.

However, electric vehicles are preferably equipped solely with cooling openings situated below the bumper, further preferably a single cooling opening situated below the bumper.

In fact the electric motor does not need an air supply. The reduction in the number of cooling openings also allows an improvement in the aerodynamic characteristics of the electric vehicle. This is also reflected by a better autonomy and a higher top speed of the motor vehicle.

Under these conditions, the use of a conventional cooling module appears unsatisfactory. Indeed, a majority of heat exchangers are no longer correctly cooled by the air flow coming solely through the lower cooling opening(s).

An object of the invention is to propose a cooling module for an electric motor vehicle without at least some of the above-mentioned drawbacks.

DISCLOSURE OF THE INVENTION

To this end, the object of the invention is a cooling module for a motor vehicle with an electric motor, comprising at least one heat exchanger, at least one tangential-flow turbomachine capable of creating an air flow in contact with the heat exchanger, a plurality of flaps which are movable between a first position, called the open position of the cooling module, and a second position, called the closed position of the cooling module, said plurality of flaps occupying a portion of the cooling module not occupied by said at least one tangential-flow turbomachine.

Thus advantageously, the tangential-flow turbomachine allows creation of an air flow through all heat exchangers with a significantly better efficiency than if a propeller fan were used.

As a preference, the cooling module comprises one or more of the following features, considered alone or in combination:
  said plurality of flaps is arranged downstream of the at least one heat exchanger relative to the direction of flow of said air flow in the cooling module;
  said plurality of flaps at least partially forms a rear face of the cooling module;
  the module comprises a single tangential-flow turbomachine, a rotational axis of which extends in a direction parallel to a length or a width of the at least one heat exchanger;
  the turbomachine extends in a top part, a bottom part or an intermediate part of the rear face of the cooling module;
  the module is configured to position said plurality of flaps in the open position when said at least one tangential-flow turbocharger has stopped;
  said at least one turbomachine is configured to stop when an air flow in the at least one heat exchanger is greater than or equal to a maximum air flow which can be aspirated by said at least one tangential-flow turbomachine;
  the flaps are of the passive type;
  the flaps are controlled by an actuator.

The invention also concerns a motor vehicle with an electric motor, comprising a body, a bumper and a cooling module as described above, the body defining at least one cooling opening arranged below the bumper, the cooling module being arranged opposite the at least one cooling opening.

BRIEF DESCRIPTION OF THE DRAWINGS

Other characteristics, details and advantages of the invention will become apparent upon reading the detailed description below, and upon analyzing the appended drawings, in which:

FIG. 5 is a schematic view of a detail of the cooling module from FIG. 2;

FIG. 6 is a perspective view of the cooling module from FIG. 2 in an opposite orientation;

DESCRIPTION OF EMBODIMENTS

In the remainder of the description, elements that are identical or perform identical functions bear the same reference sign. In the present description, for the sake of conciseness, these elements are not described in detail within each embodiment. Rather, only the differences between the embodiment variants are described in detail.

Figure 1:
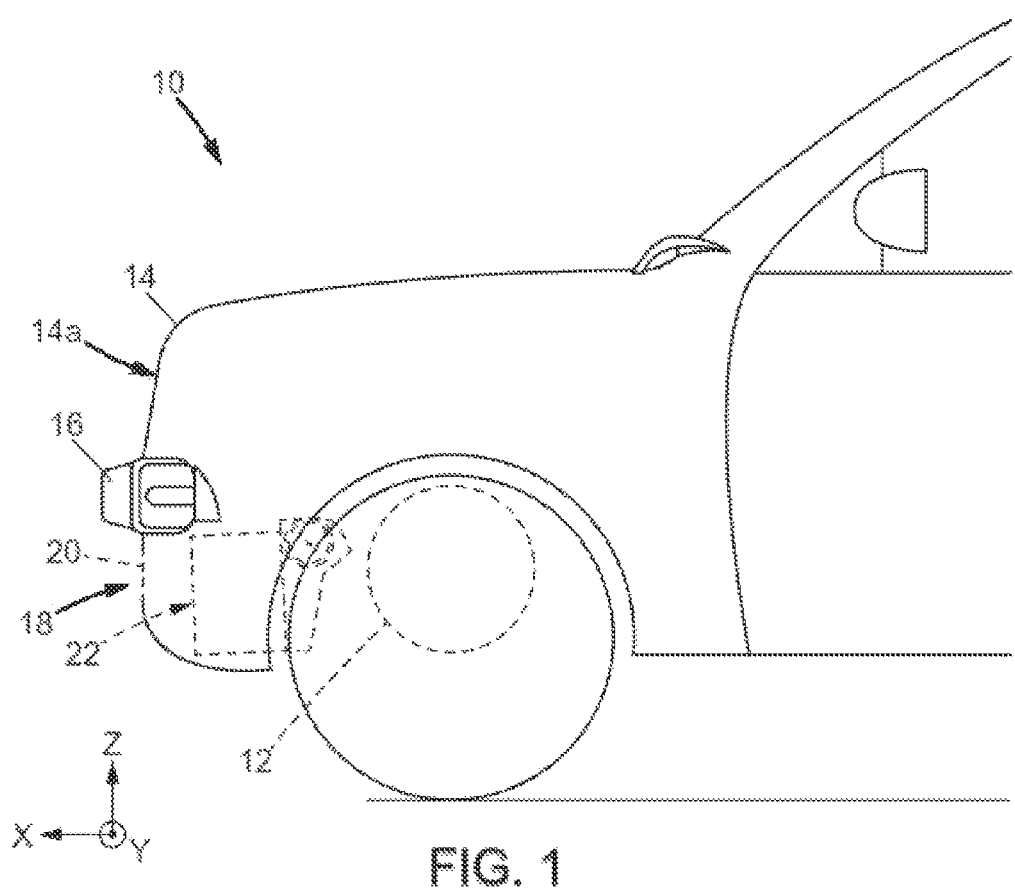
FIG. 1 depicts schematically the front part of a motor vehicle with an electric motor, viewed from the side.

FIG. 1 illustrates schematically the front part of a motor vehicle 10 with an electric motor 12. The vehicle 10 comprises in particular a body 14 and a bumper 16 carried by a chassis (not shown) of the motor vehicle 10. The body 14 defines a cooling opening 18, i.e. an opening through the body 14. Here there is only one cooling opening 18. This cooling opening 18 is situated in the lower part of the front face 14a of the body 14. In the example illustrated, the cooling opening 18 is situated below the bumper 16. A grille 20 may be arranged in the cooling opening 18 to prevent projectiles from being able to pass through the cooling opening 18. A cooling module 22 is arranged opposite the cooling opening 18. The grille 20 in particular provides protection for the cooling module 22.

Figure 2:
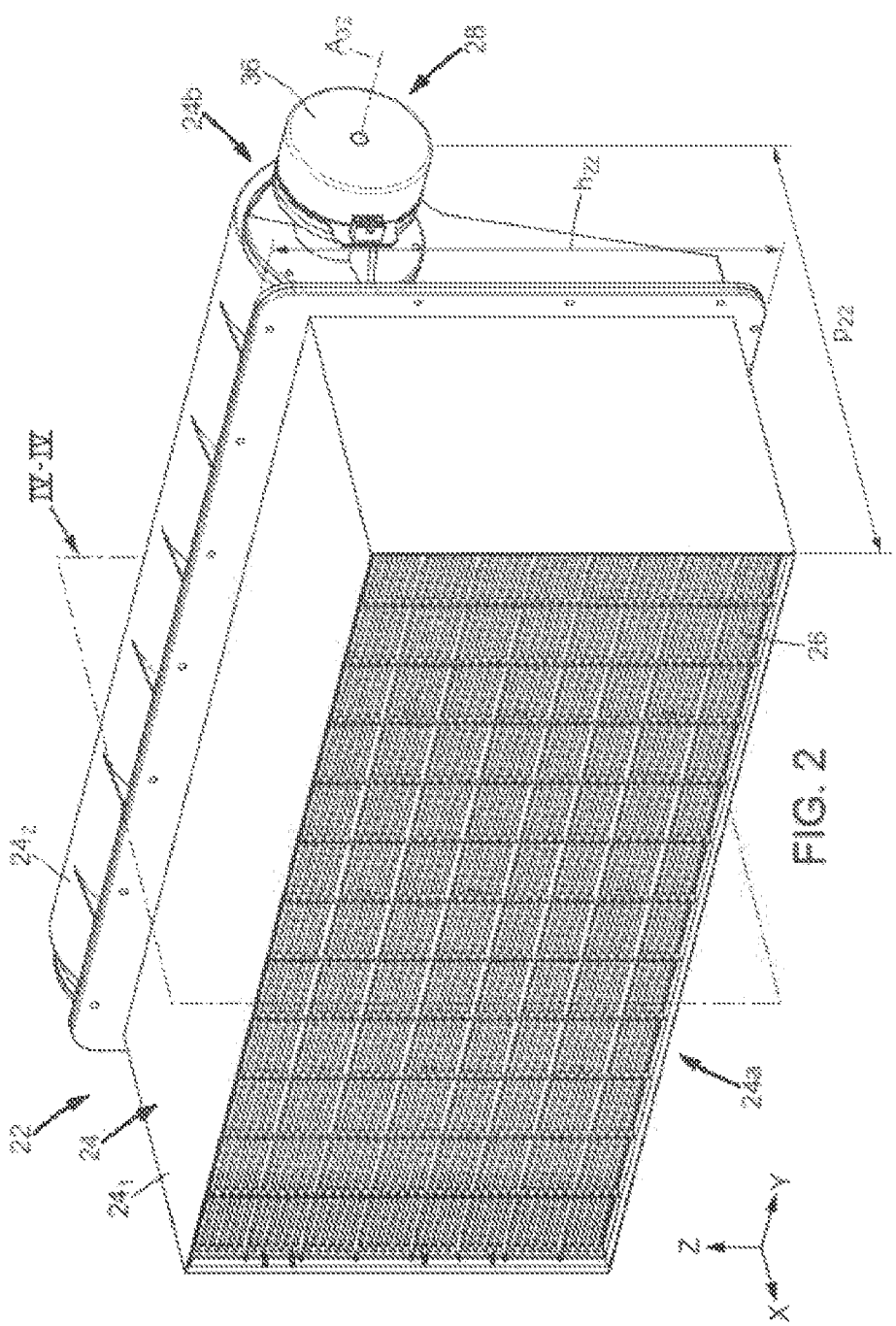
FIG. 2 is a schematic perspective view of a cooling module which may be used in the motor vehicle from FIG. 1 (a set of flaps not being shown)

The cooling module 22 is more clearly visible on FIG. 2.

As illustrated on FIG. 2, the cooling module 22 essentially comprises a casing 24 forming an internal channel between two opposite ends 24a, 24b. The end 24a is intended to be arranged opposite the cooling opening 18. The opening of the casing 24 at this front end 24a of the channel may be partially blocked by means of a mesh 26.

The casing 24 is here made in two parts $24_1$, $24_2$ which are fixed together by any means accessible to the person skilled in the art. In this case, the two parts $24_1$, $24_2$ are screwed together at a collar. The front part $24_1$ has substantially the form of a rectangular parallelepiped open on two opposite faces. The rear part $24_2$ has a substantially more complex form. This rear part $24_2$ here in particular forms the volute of the tangential-flow turbomachine 28.

Figure 3:
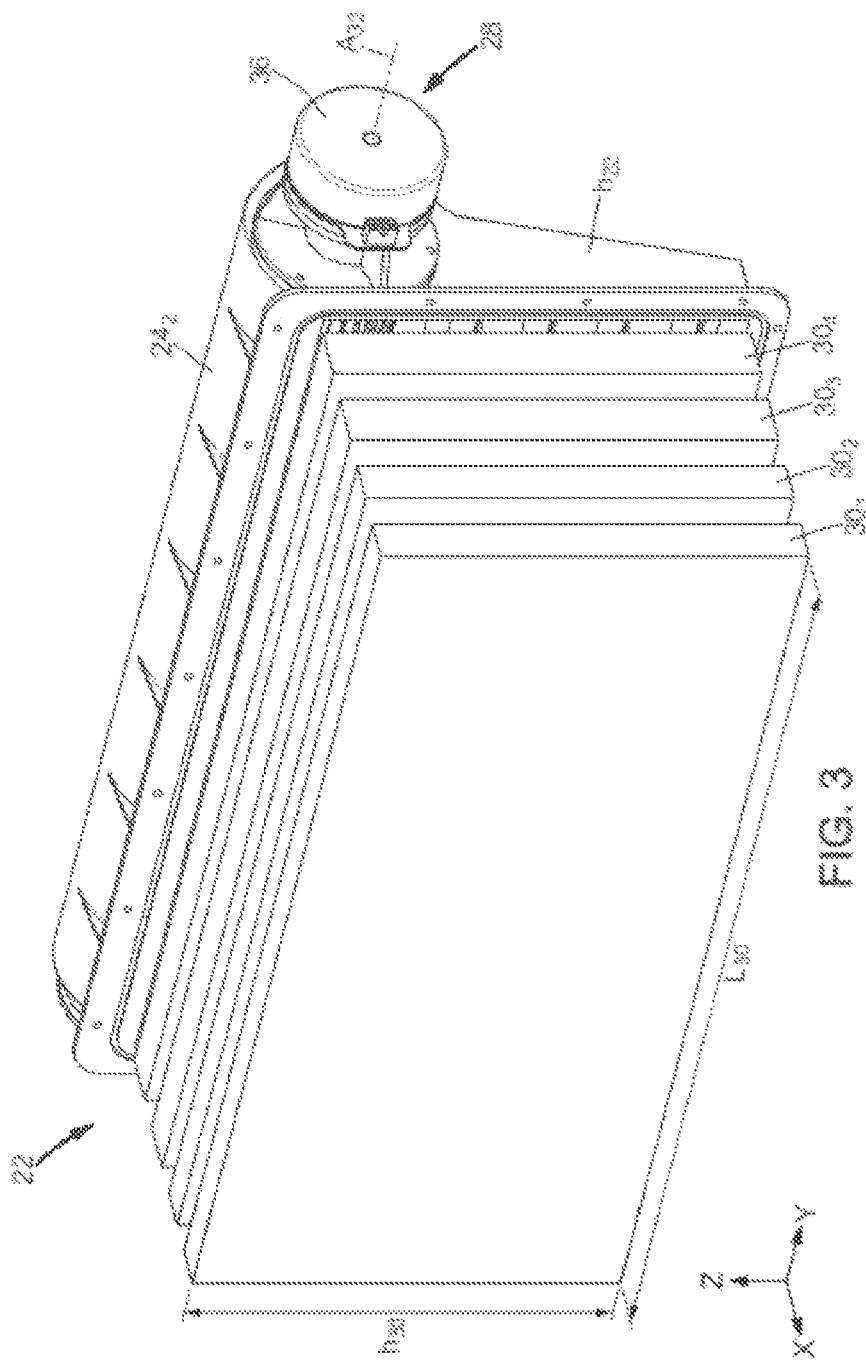
FIG. 3 is a view similar to FIG. 2 of the same cooling module, in which part of the casing has been removed.

FIG. 3 illustrates the cooling device 22 in which the front part $24_1$ of the casing 24 has been removed. FIG. 3 thus illustrates the presence of a plurality of heat exchangers $30_1$-$30_4$ in the conduit formed inside the casing 24. Here, four heat exchangers $30_1$-$30_4$ are provided. Of course, this number of heat exchangers is nonlimiting. Rather, a different number of heat exchangers may be provided in the casing, in particular at least one heat exchanger, and preferably between four and seven heat exchangers, even more preferably four or five heat exchangers. The heat exchangers $30_1$-$30_4$ are illustrated schematically in FIG. 3 in the form of substantially rectangular plates. In practice and notably, the heat exchangers $30_1$-$30_4$ have in particular a height $h_{30}$, measured in a substantially vertical direction, which is less than or equal to 350 mm. The heat exchangers $30_1$-$30_4$ are thus particularly well dimensioned for being in contact with an air flow passing through the cooling opening 18.

In the example illustrated in FIG. 3, all heat exchangers $30_1$-$30_4$ are identical and all have a same height $h_{30}$. In the case where the heat exchangers $30_1$-$30_4$ have different heights, it is preferred that all these heights are less than or equal to 350 mm.

Preferably, the height $h_{30}$ of the heat exchangers $30_1$-$30_4$ is between 70 mm and 300 mm. This indeed ensures a satisfactory performance of the heat exchangers $30_1$-$30_4$ while retaining a reduced size of these heat exchangers, the size being particularly suitable for the use of a single cooling opening 18. Here again, in the case where the heat exchangers $30_1$-$30_4$ have different heights, it is preferred that the height of each heat exchanger $30_1$-$30_4$ is between 70 and 300 mm.

Even more preferably, the cooling module 22 has a height $h_{22}$ between 70 mm and 300 mm. It is understood that the height $h_{30}$ of the heat exchangers $30_1$-$30_4$ is always substantially less than the height $h_{22}$ of the cooling module 22.

To compensate for the relatively low height of the heat exchangers $30_1$-$30_4$, these may be relatively numerous, in particular up to four or five heat exchangers $30_1$-$30_4$, even up to seven heat exchangers. Indeed, to achieve performance levels comparable to those of conventional cooling modules, the number of heat exchangers may be doubled by arranging them in pairs, in series, in the circuit of the fluid passing through them. In other words, a heat exchanger of a conventional cooling module may correspond to two heat exchangers or more in the cooling module 22, through which the same fluid passes. In this case in particular it is useful if the heat exchangers are arranged one behind the other in the conduit formed by the casing 24. The order of the heat exchangers may be determined as a function of a temperature of the fluid passing through them, or a distance of the heat exchanger concerned from a heat source in the circuit of fluid passing through them. Thus the heat exchangers through which a hot fluid flows are arranged further from the end 24a of the casing 24, intended to be arranged just behind the cooling opening 18, than heat exchangers through which a colder fluid flows.

The arrangement of heat exchangers $30_1$-$30_4$ one behind the other in the axial direction X of the cooling module 22 may also limit the size of the cooling module 22 in its two other lateral and vertical dimensions. This preferably, the depth $p_{22}$ of the cooling module 22 is between 12 mm and 140 mm. Also, the width $L_{30}$ of the heat exchangers $30_1$-$30_4$ or of each heat exchanger $30_1$-$30_4$ may lie between 12 mm and 140 mm.

In addition, because of the shape of the heat exchangers $30_1$-$30_4$, a tangential-flow turbomachine 28 is preferred. In fact a propeller fan would be unable to create a substantially uniform air flow in contact with the heat exchangers $30_1$-$30_4$, in particular over substantially the entire length of these heat exchangers $30_1$-$30_4$, a length measured in the lateral direction Y.

Here, the tangential-flow turbomachine 28 comprises a turbine 32 (or tangential impeller). The turbine 32 has a substantially cylindrical form, as is shown particularly clearly on FIG. 5. The turbine 32 comprises several stages of blades 34 (or vanes), in this case sixteen stages of blades 34. Naturally, this number of stages of blades 34 is not limiting, and the turbine 32 may more generally comprise at least one stage of blades 34.

Each stage of blades 34 comprises a same number of blades 34 evenly distributed angularly around the rotational axis $A_{32}$ of the turbine 32. Advantageously, the stages of blades 34 are angularly offset such that the blades 34 are not aligned, preferably such that no blade 34 is aligned with another blade 34 of another stage of blades 34 in the lateral direction Y of the cooling module 22. This then avoids the blades 34 of the turbine 32 generating noise, particularly because of the fact that all the blades 32 would be working in synchrony. By offsetting the blades 34, it is possible rather to ensure that the blades 34 work in separate groups, which makes it possible to reduce the noise generated. This gives a tangential-flow turbomachine 28 in which the sound nuisance can be limited. This is particularly important in the case of a cooling module 22 for a motor vehicle with electric motor, since an electric motor is known to be less noisy than an internal combustion engine. In addition, the cooling module 22 is intended to be used also when the electric motor has stopped, in particular when the batteries are being recharged. The noise of the tangential-flow turbomachine 28 may then be considered a nuisance by users.

The blades 34 of each stage may in particular be offset by half the spacing between the blades 34, with respect to each of the two neighboring stages. Thus, a first half of the stages of blades 34 have blades 34 which are aligned with one another and which are offset by half the angular spacing between the blades 34 relative to the blades 34 of the other half of the stages of blades 34. The noise generated by the rotating turbine 22 can thus theoretically be substantially halved, which corresponds to a reduction of the order of 3 dB in the noise emitted.

Alternatively, the angular offset of the blades 34 between two adjacent stages of blades 34 corresponds to the thickness of a blade 34.

Alternatively or in addition, the spacing between the blades 34 may be divided into substantially as many intermediate positions as there are stages of blades 34. Thus, the blades 34 of the various stages of blades 34 may be offset step-by-step in the same angular direction, along a longitudinal direction of the turbine 32. The blades 34 of the various stages therefore extend substantially in a helix along the various stages of blades 34. In this particular case, all the blades 34 of all the stages of blades 34 are offset with respect to all the blades 34 of all the other stages of blades 34. This allows an even greater reduction in the noise generated by the rotating turbine 32.

Of course, numerous other configurations are accessible to those skilled in the art, allowing all the blades 34 of all the stages of blades 34 to be offset relative to all the other blades 34 of all the other stages of blades 34. In particular, based on the preceding configuration in which the blades 34 of the various stages 34 extend in the manner of the helix, it is possible to swap the various stages around, without altering their orientation about the longitudinal axis of the turbine 32.

The turbomachine 28 also comprises a motor 36 (or gear motor) able to drive the turbine 32 in rotation about its rotational axis $A_{32}$. Advantageously, the rotational axis $A_{32}$ of the turbine 32, which corresponds to the height direction of the turbine 32, is oriented substantially parallel to the lateral direction Y of the heat exchangers $30_1$-$30_4$. The turbomachine 28 is thus able to create a substantially constant air flow over the entire width of a same heat exchanger $30_1$-$30_4$. In order to optimize the air flow created, the height $h_{32}$ of the turbine 32 is substantially equal to the width $L_{30}$ of the heat exchangers $30_1$-$30_4$.

The motor 36 is for example able to drive the turbine 32 in rotation at a speed between 200 rpm and 14,000 rpm. This allows in particular a limitation of the noise generated by the turbomachine 28.

The diameter $D_{32}$ of the turbine 32 is for example between 35 mm and 200 mm as limits. The turbomachine 28 is thus compact.

Figure 4:
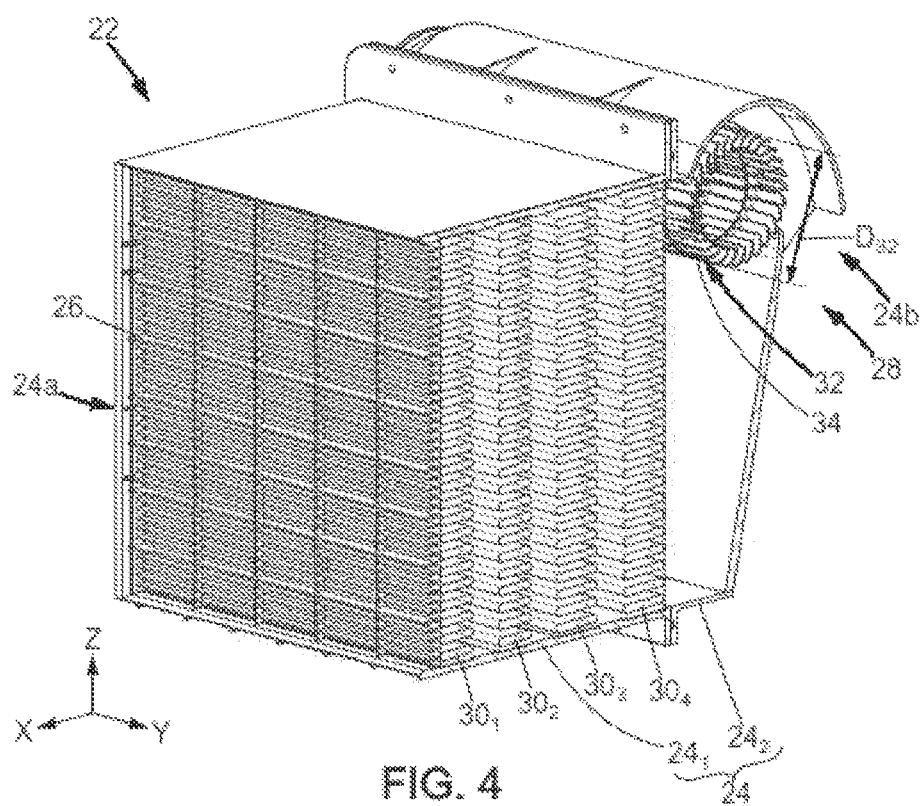
FIG. 4 is an extract view along plane IV-IV of the cooling module from FIG. 2.

As already stated, the rear part $24_2$ of the casing 24 forms the volute of the turbomachine 28, as can be seen more particularly from FIGS. 4 and 5. In addition, the cross-section of the conduit formed in the casing 24 is significantly greater at the end 24a than at its opposite end 24b. This allows the turbomachine 28 to create an air flow in the casing 24 which has a specific pressure, in order to facilitate the passage of said air flow through the conduit through the casing 24, despite the presence of the heat exchangers $30_1$-$30_4$.

As shown in FIGS. 7a to 7c, and 9 to 12, the cooling module 22 also comprises a plurality of flaps 36.

Figure 9:
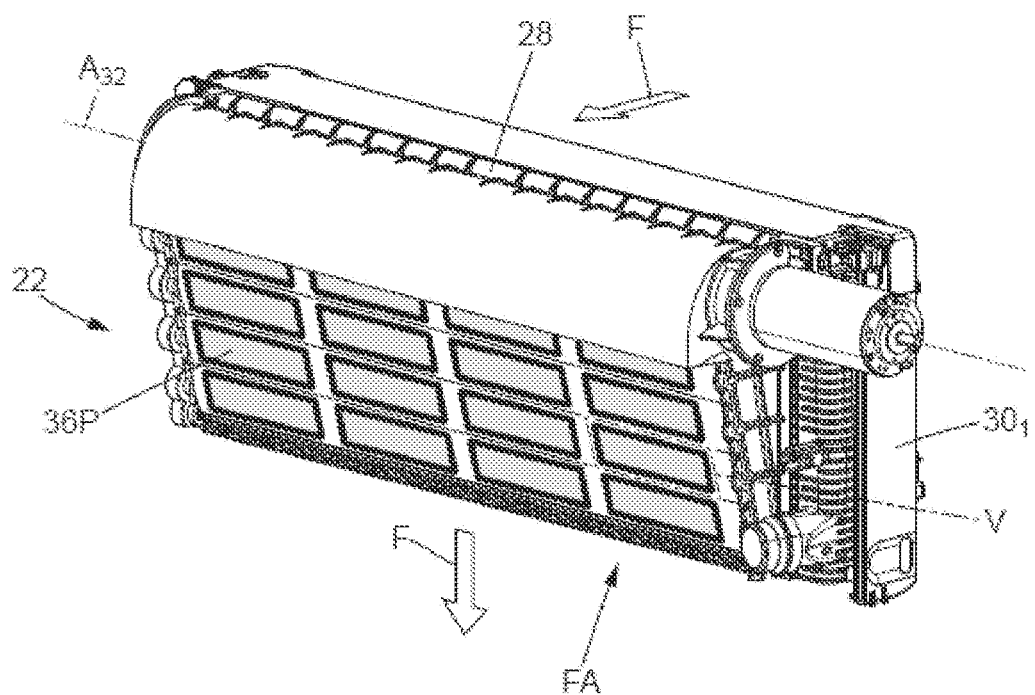
FIG. 9 illustrates schematically a perspective view of the cooling module from FIG. 7a with passive flaps.
Figure 10:
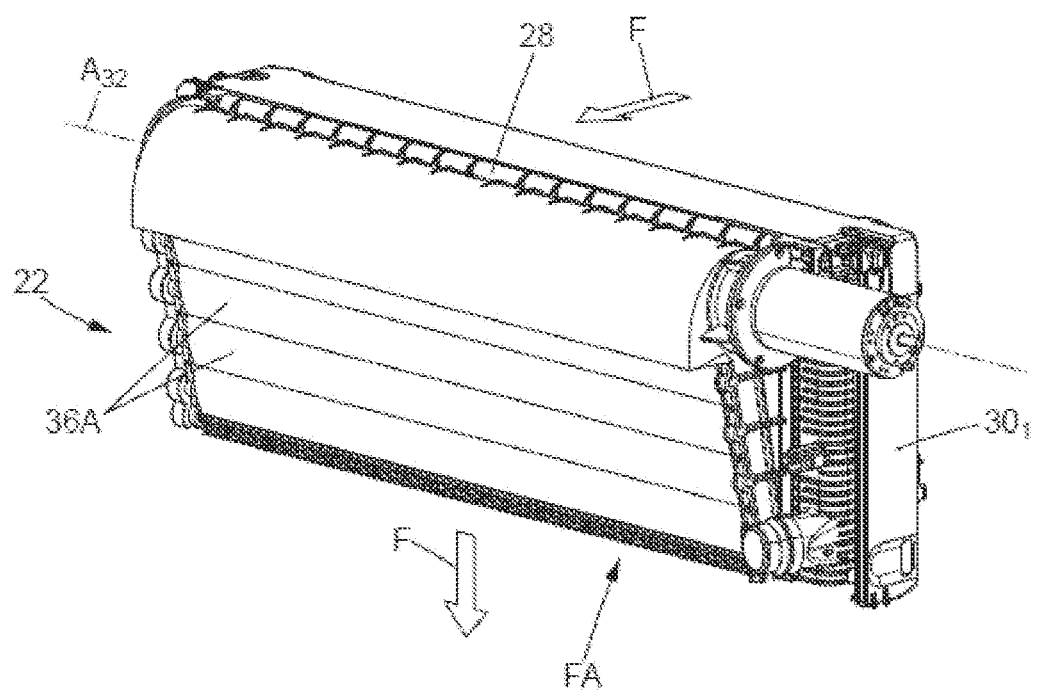
FIG. 10 illustrates schematically a perspective view of the cooling module from FIG. 7a with controlled flaps.
Figure 11:
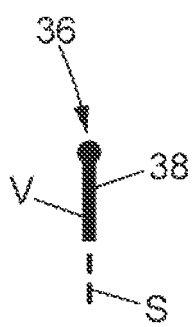
FIG. 11 is a schematic side view of a flap from FIG. 9 or FIG. 10 in the closed position.

The flaps 36 are mounted so as to be movable between a first position, called the open position of the cooling module (FIG. 12), and a second position, called the closed position of the cooling module (illustrated on FIGS. 9, 10, 11).

On FIGS. 9 and 10, the cooling module 22 comprises several flaps 36 distributed over several rows and arranged parallel to the rotational axis $A_{32}$ of the single turbomachine 28. The set of the plurality of flaps 36 firstly and the turbomachine 28 secondly form a rear face FA of the cooling module 22. In the rear face, the flaps 36 occupy a portion separate from the portion occupied by the turbomachine 28. Thus the cooling module 22 is compact and ensures better performance and a saving of electrical current, as will be explained below.

As these figures illustrate, each of the flaps 36 comprises a wall 38 mounted pivoting around a rotational axis parallel to the rotational axis $A_{32}$.

Preferably, in the closed position (FIG. 11), the walls 38 of the flaps 36 are contiguous, which blocks the entire portion of the face occupied by the flaps 36.

Figure 12:
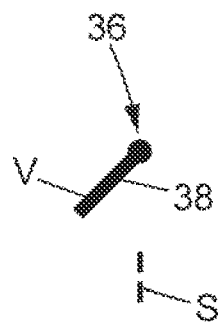
FIG. 12 is a schematic side view of a flap from FIG. 11 in an open position.

In each open position (FIG. 12), each wall 38 locally forms an angle not equal to zero with the surface S, which allows the air flow F to pass through the cooling module 22 as shown on FIG. 12.

Figure 7A:
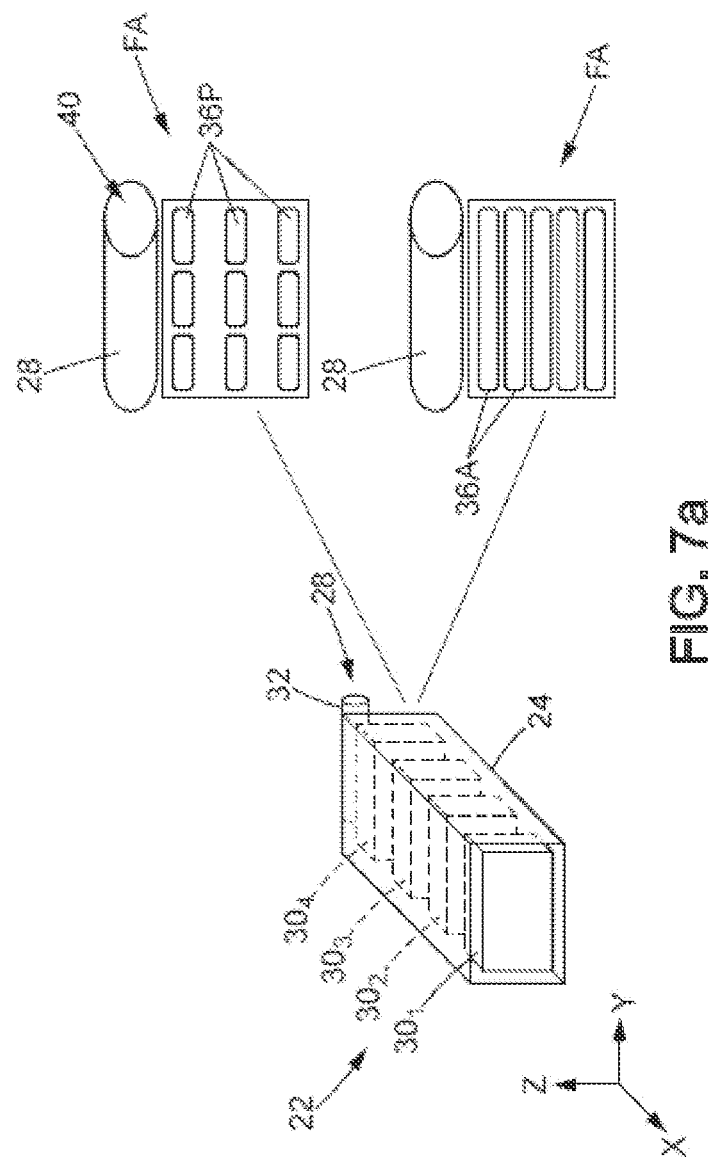
FIG. 7a illustrates schematically a first variant of the cooling module with two possible flap types.

On FIG. 7a, the turbomachine 28 occupies a top zone 40 of the rear face, in particular in the upper third of the casing 24, preferably in the upper quarter of the casing 24. This in particular allows protection of the turbomachine 28 in the case of submersion, and/or limits the space taken up by the cooling module 22 in its bottom portion. The plurality of flaps 36 in FIG. 7a occupies a complementary part of the rear face FA, including a median zone 42 and a bottom zone 44.

Figure 7B:
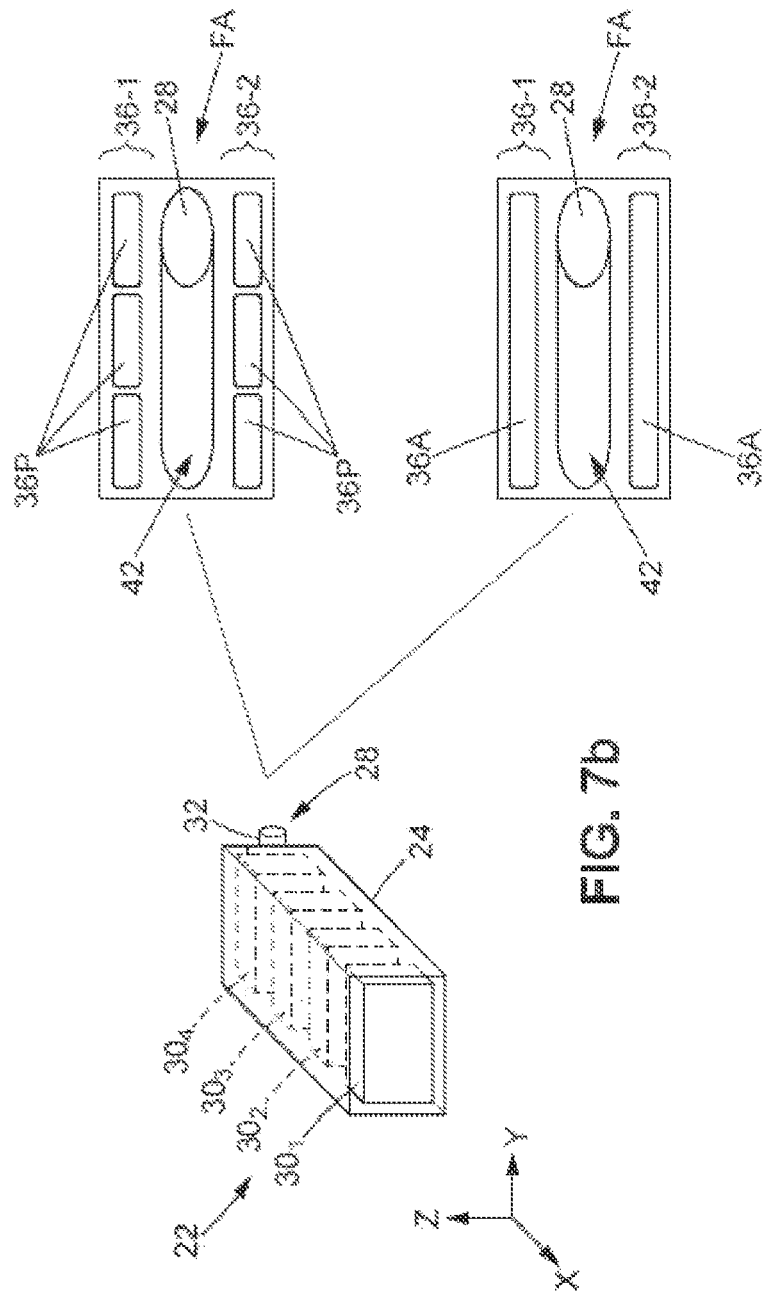
FIG. 7b illustrates schematically a second variant of the cooling module with two possible flap types.

In FIG. 7b, the turbomachine 28 occupies the median zone 42, in particular the middle third of the height of the casing 24, for example for reasons of integration of the cooling module 24 in its environment. The flaps are distributed in two levels, one 36-1 situated above the turbomachine 28 and another 36-2 situated below the turbomachine 28.

Figure 7C:
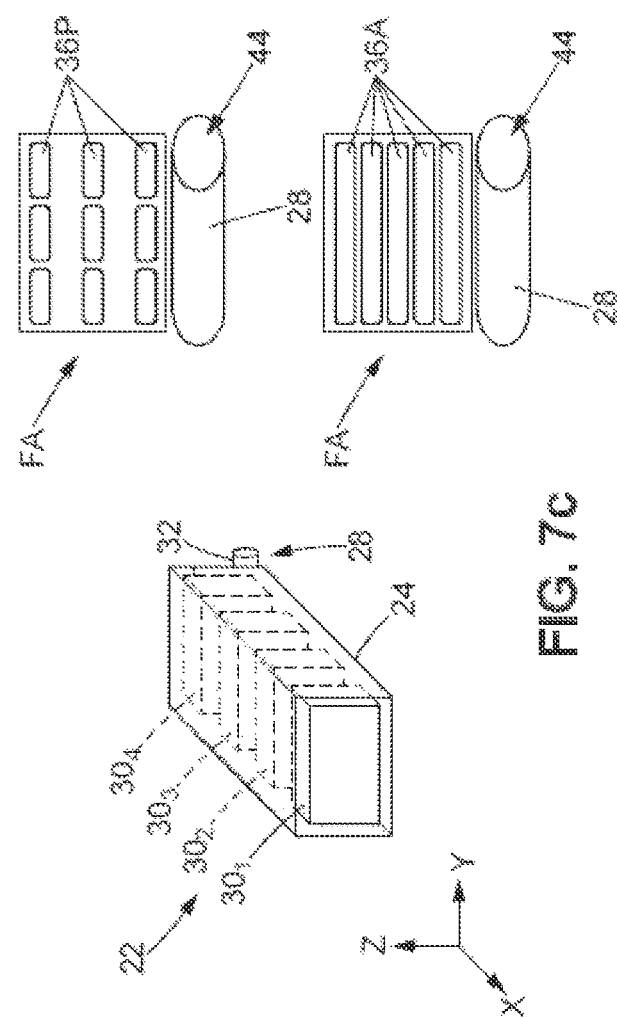
FIG. 7c illustrates schematically a third variant of the cooling module with two possible flap types.

In FIG. 7c, the turbomachine 28 occupies the bottom zone 44 of the rear face, in particular the lower third of the casing 24, so the space taken up by the cooling module 22 in its top part can be limited. The plurality of flaps 36 in FIG. 7c occupies a complementary part of the rear face FA.

The cooling module 22 is configured to position the flaps 36 in the open position when the tangential-flow turbomachine 28 has stopped.

Preferably, the turbomachine 28 stops when a flow of air passing through said plurality of heat exchangers $30_1$-$30_4$ of the cooling module 22 is greater than or equal to a maximum air flow which can be aspirated by the tangential-flow turbomachine 28. This condition is fulfilled in particular at high speed, for example when the vehicle is driving on a motorway.

Such a configuration, because it allows stoppage of the turbomachine as soon as the air flow generated by the speed of the vehicle is sufficient, ensures a real saving of current and thus a longer autonomy of the electric vehicle.

According to a first variant illustrated in FIGS. 7a, 7b, 7c and FIG. 9, the flaps are of the passive type, i.e. they are not electrically powered. They are referenced 36P.

Thus at a low vehicle speeds, the turbomachine 28 operates and draws in the air flow F which passes through the heat exchangers $30_1$-$30_4$ and opens the flaps 36P.

At high vehicle speeds, the turbomachine 28 stops and the air flow directly generated by the movement of the vehicle passes through the heat exchangers $30_1$-$30_4$ and opens the flaps 36.

Advantageously, the flaps are made of plastic material PA6 or PA66.

According to a second variant illustrated in FIGS. 7a, 7b, 7c and FIG. 10, the flaps are controlled by an actuator. They are referenced 36A.

Thus at a low vehicle speeds, the turbomachine 28 operates and draws in the air flow F which passes through the heat exchangers $30_1$-$30_4$ and opens the flaps 36A.

At high vehicle speeds, the turbomachine 28 stops and the actuator moves the flap 36A into the open position.

The invention is not limited to the exemplary embodiments described with respect to the figures, and further embodiments will be clearly apparent to a person skilled in the art. In particular, the various examples can be combined, provided they are not contradictory.

Figure 8:
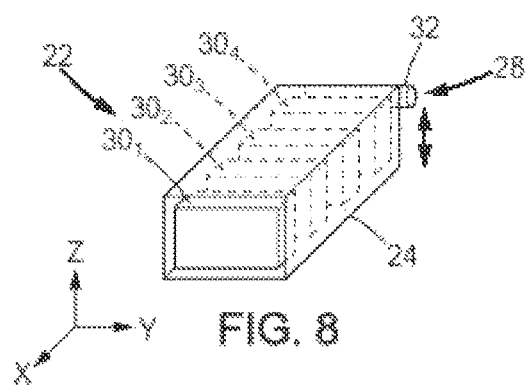
FIG. 8 illustrates schematically a fourth variant of the cooling module (a set of flaps not being shown)

Also, according to the example illustrated in FIG. 8, the turbomachine 28, and more particularly the turbine 32 of this turbomachine 28, is movable relative to the heat exchangers $30_1$-$30_4$ in the height direction of these heat exchangers $30_1$-$30_4$. Such a configuration may for example allow precise temporal management of the cooling of some of the heat exchangers $30_1$-$30_4$.

Also, in the examples illustrated, the turbomachine 28 functions by suction, i.e. it draws in ambient air and conducts it into contact with the various heat exchangers $30_1$-$30_4$. Alternatively however, the turbomachine 28 operates by blowing, blowing the air towards the different heat exchangers $30_1$-$30_4$.

Also, whereas in the example described with reference to FIGS. 2 to 6, the turbomachine is situated in the casing of the cooling module, the turbomachine may be arranged outside the casing at one end or another end of this casing, depending on whether or not it functions by suction or blowing.

Furthermore, other variants are also possible for the flaps 36.

For example, the flaps 36 may extend orthogonally to the rotational axes $A_{32-1}$, $A_{32-2}$.

Also, the flaps 36 may partially occupy only the surface S. This is the case for example if the flaps 36 are arranged in every other row.

The invention claimed is:

1. A cooling module for a motor vehicle with an electric motor, comprising:
   at least one heat exchanger;
   at least one tangential-flow turbomachine capable of creating an air flow in contact with the heat exchanger; and
   a plurality of flaps which are movable between a first position, called an open position of the cooling module, and a second position, called a closed position of the cooling module,
   wherein the plurality of flaps occupy a portion of the cooling module not occupied by the at least one tangential-flow turbomachine;
   wherein the plurality of flaps are controlled by an actuator, and
   wherein the plurality of flaps are situated both above and below the at least one tangential-flow turbomachine in a height direction of the at least one heat exchanger.

2. The cooling module as claimed in claim 1, wherein the plurality of flaps is arranged downstream of the at least one heat exchanger relative to a direction of flow of the air flow in the cooling module.

3. The cooling module as claimed in claim 1, wherein the plurality of flaps at least partially forms a rear face of the cooling module.

4. The cooling module as claimed in claim 3, further comprising: a single tangential-flow turbomachine, a rotational axis of which extends in a direction parallel to a length or a width of the at least one heat exchanger.

5. The cooling module as claimed in claim 4, wherein the at least one tangential-flow turbomachine extends in a top part, a bottom part or an intermediate part of the rear face of the cooling module.

6. The cooling module as claimed in claim 1, configured to position the plurality of flaps in the open position when the at least one tangential-flow turbocharger turbomachine has stopped.

7. The cooling module as claimed in claim 6, wherein the at least one tangential-flow turbomachine is configured to stop when the air flow in the heat exchanger is greater than or equal to a maximum air flow which can be aspirated by the at least one tangential-flow turbomachine.

8. A motor vehicle with an electric motor, comprising:
   a body;
   a bumper; and
   the cooling module as claimed in claim 1,
   the body defining at least one cooling opening arranged below the bumper, the cooling module being arranged opposite the at least one cooling opening.

* * * * *